United States Patent [19]

Sidman

[11] Patent Number: 5,068,959
[45] Date of Patent: Dec. 3, 1991

[54] METHOD OF MANUFACTURING A THIN FILM HEAD

[75] Inventor: Alan L. Sidman, Wellesley, Mass.

[73] Assignee: Digital Equipment Corporation, Maynard, Mass.

[21] Appl. No.: 582,799

[22] Filed: Sep. 11, 1990

Related U.S. Application Data

[63] Continuation of Ser. No. 329,429, Mar. 28, 1989, abandoned, which is a continuation-in-part of Ser. No. 217,397, Jul. 11, 1988, abandoned.

[51] Int. Cl.$^5$ .............................................. G11B 5/42
[52] U.S. Cl. ...................................... 29/603; 427/130; 427/131
[58] Field of Search ............ 29/603; 360/120, 125–127; 427/128, 130, 131

[56] References Cited

U.S. PATENT DOCUMENTS

| | | |
|---|---|---|
| 3,052,885 | 9/1962 | Kump . |
| 3,114,011 | 12/1963 | Shirakura . |
| 3,341,667 | 9/1967 | Brown et al. . |
| 3,961,374 | 6/1976 | Murata et al. ..................... 360/118 |
| 4,069,094 | 1/1978 | Shaw et al. . |
| 4,195,323 | 3/1980 | Lee . |
| 4,199,384 | 4/1980 | Hsu . |
| 4,242,710 | 12/1980 | Hempstead et al. . |
| 4,251,319 | 2/1981 | Bonnie et al. . |
| 4,317,700 | 3/1982 | Tanaka et al. . |
| 4,391,849 | 7/1983 | Bischoff ............................. 427/129 |
| 4,402,801 | 9/1983 | Omata et al. ........................ 204/15 |
| 4,404,609 | 9/1983 | Jones, Jr. . |
| 4,409,319 | 10/1983 | Colacino et al. . |
| 4,427,713 | 1/1984 | White et al. . |
| 4,532,005 | 7/1985 | Grieco et al. . |
| 4,575,777 | 3/1986 | Hosokawa . |
| 4,601,099 | 7/1986 | Nishiyama . |
| 4,621,045 | 11/1986 | Goodner . |
| 4,652,954 | 3/1987 | Church ............................. 29/603 X |
| 4,656,546 | 4/1987 | Mallory . |
| 4,665,007 | 5/1987 | Cservak et al. . |
| 4,665,010 | 5/1987 | Herd et al. . |
| 4,685,014 | 8/1987 | Hanazono et al. ............... 29/603 X |
| 4,691,719 | 12/1987 | Kobayashi et al. .................... 29/603 |
| 4,695,351 | 9/1987 | Mallory . |
| 4,705,597 | 11/1987 | Gimpelson et al. . |
| 4,713,710 | 12/1987 | Soda et al. . |
| 4,729,050 | 3/1988 | Koyama ............................ 360/125 |
| 4,745,045 | 5/1988 | Fredericks et al. . |
| 4,753,866 | 6/1988 | Welch et al. . |
| 4,768,118 | 8/1988 | Kuriyama . |
| 4,777,553 | 10/1988 | Aoi et al. . |
| 4,799,118 | 1/1989 | Yamada et al. . |
| 4,803,580 | 2/1989 | Mowry . |
| 4,816,947 | 3/1989 | Vinal et al. . |
| 4,819,107 | 4/1989 | Bolt . |
| 4,821,126 | 4/1989 | Matsumoto . |
| 4,828,966 | 5/1989 | Mallary et al. . |
| 4,837,924 | 6/1989 | Lazzari . |
| 4,885,649 | 12/1989 | Das . |
| 4,912,584 | 3/1990 | Mallary et al. . |
| 4,935,832 | 5/1990 | Das et al. . |

FOREIGN PATENT DOCUMENTS

| | | |
|---|---|---|
| 0012913 | 7/1980 | European Pat. Off. . |
| 0128625 | 12/1984 | European Pat. Off. . |
| 0189793 | 8/1986 | European Pat. Off. . |
| 58-111114(A) | 2/1983 | Japan . |
| 59-167819A | 9/1984 | Japan . |
| 62-219218A | 9/1987 | Japan . |
| WO88/07741 | 10/1988 | PCT Int'l Appl. . |

Primary Examiner—Carl E. Hall
Attorney, Agent, or Firm—Fish & Richardson

[57] ABSTRACT

Recording head to optimize high density recording by reduction of hooks on ends of transitions, the recording head having at least two poles with a gap section inbetween and configured with the second pole and gap section being greater in width than the first pole. Transverse field components are reduced at the head fringes and the transition becomes substantially parallel to gap. The vertical components of the head field are also minimized. Method for producing head with narrow first pole includes planarization of first pole area to receive wider gap layer and wider second pole.

22 Claims, 3 Drawing Sheets

TYPICAL ISOLATED PULSE FROM A THIN FILM HEAD

TRANSITIONS RESULTING FROM POLES OF DIFFERENT WIDTHS (INPLANE ONLY H=Hc CONTOUR)

METHOD OF MANUFACTURING A THIN FILM HEAD

This is a continuation of copending application Ser. No. 07/329,429 filed on Mar. 28, 1989, now abandoned which is a continuation-in-part of application Ser. No. 07/217,397 filed on July 11, 1988 now abandoned.

The present invention relates to design of a magnetic recording head which optimizes high density longitudinal recording.

A magnetic recording head produces a magnetic field which has transverse, vertical, and longitudinal components. the longitudinal component is directed along the recording medium direction of motion, the vertical component is normal to the plane of the medium, and the transverse component is oriented along the track width direction. Recording heads are ordinarily designed such that the strength of the head field at the medium mid-plane directly beneath the gap center line of the head is about two to three times the value of the medium coercivity, where coercivity is the amount of field strength necessary to switch the orientation of the magnetization in the medium. A track is created during the head write cycle by the downstream magnetic field of the head where it equals the coercivity threshold of the medium. When a data bit is written, the medium magnetic orientation is reversed on the track at an assigned location. Each of the sections of the medium where the magnetization has been reversed is referred to individually as a "transition". The width of the track defined on the recording medium will be approximately equal to the width of the head gap.

A typical recording head will include two pole pieces with the gap defined therebetween. The actual recording of a transition occurs somewhat downstream along the direction of the moving medium, approximately 0.25 microns into the second pole piece in the longitudinal direction.

The transverse field component from the head is comparable in magnitude to the longitudinal field component at the sides of the head, the latter known as the fringe zones. For thin film media, the two in-plane components of the head field, i.e. the transverse and longitudinal components, add vectorially in their impact on the transition. In the mid-section of the track, only the longitudinal field exists and hence it produces an essentially straight line transition perpendicular to the direction of medium movement. However, the recorded transition is not parallel to the gap in the fringe zones because of the varying degrees of interaction between the two in-plane components. In fact, at the fringe zones the transition will be perturbed at its ends where hooks are defined protruding further into the downstream section of the medium. These hooks cause inter-symbol interference during the writing of closely spaced bits and can cause lateral asymmetry in the readback pulse. In addition, the medium coercivity may be degraded when the perpendicular (vertical) component of the head field that is imposed upon the medium is large.

In the known processes used to manufacture recording heads of the type discussed above, the second pole is normally configured to be as wide as or about one to three microns narrower than the first pole at the gap. Such designs suffer from the fringe zone and vertical field effects problems discussed above during longitudinal recording on thin film media.

SUMMARY OF THE INVENTION

In one aspect of the invention, a method is disclosed in which a recording head having two pole pieces is designed so as not to produce hooks in a recorded transition. In such arrangement, the transverse head field components are substantially reduced in the recorded zone by producing a second pole piece which is wider in cross-section at its tip than the first pole piece tip cross-section.

In another aspect of the invention, where a magnetic recording head has two pole pieces defining a gap section or layer therebetween, the second pole piece is configured to be perhaps about one or more microns wider than the first pole piece. In this arrangement, the transverse fields at the fringe zones are reduced by approximately 35% and also the contours of the longitudinal component of the head field become parallel to the gap at the fringe zones. Such a field distribution eliminates the hooks at the ends of the transition and permits the transition to be defined parallel to the gap at such locations. A straight transition prevents the nonlinear interference between a current transition and the previous transition during the writing process.

In another aspect of the invention, a method for forming the poles of a thin film head, the head having at least two poles separated by a gap section, includes the steps of (a) forming a planarizing layer at the first of the poles at its tip whereby a uniform planar area can be defined upon the pole tip and the planarizing layer, (b) forming the gap section coupled upon the uniform planar area, and (c) forming the second pole coupled upon the gap section. The planarizing layer may include photoresist material and step (a) may include hard baking the material. Step (a) may include forming a layer of insulating material adjacent to and over the first pole and lapping the insulating material such that the top surface of the first pole and the insulating material conform to a single plane whereby the uniform planar area is defined. The planarizing layer may be of $Al_2O_3$, $SiO_2$ or polyimide. Step (a) may include baking and patterning a polyimide planarizing layer.

In another aspect of the invention, in fabrication of a multilayer magnetic device, where a first structure is formed on a workpiece and serves as a base for a second structure, a process of rendering the surface of the first structure capable of supporting the second structure even if the second structure is equal to or wider than the first structure, and eliminating step/edges and spurious reflections thereby, includes the steps of applying a leveling material over the surface of the first structure, photo patterning the leveling material, exposing and developing a desired portion of the first structure, and baking the workpiece and forming a planarized plateau across and beyond the surface of the first structure, the resulting structure forming a planarized first pole of a magnetic transducer. The leveling material may be photoresist or polyimide spun on the workpiece. The leveling material may be positive photoresist and photo patterned using a resist border mark, and a photoresist border may be retained extending over the first pole tip region after exposure and development of the photoresist. The border mask inner dimension may be slightly smaller than that of the plated pole tip. The border mask may form a shoulder over the first pole. The photoresist may be hard-baked at a temperature of approximately 265° C. The polyimide may be hard-baked at a temperature of approximately 350° C. The process may further include applying a vacuum with a 10 cubic feet per hour nitrogen backfill in a magnetic field. The leveling compound may overlap the edges of the first structure by approximately one-quarter to one-half micron. Step/edges may be eliminated by provision of the planarized plateau.

In another aspect of the invention, a magnetic transducer, includes at least a functionally first pole, and at least a functionally second pole; the tip of the second pole being formable over the tip of the first pole regardless of relative pole width and alignment.

The pole tips may define a portion of an air-bearing surface, with the first pole disposed to interact with a magnetic medium before the second pole interacts with the medium, thus defining a longitudinal operational direction for the head, the poles being separated by a gap section, the gap section's width running substantially perpendicular to the longitudinal direction, and the gap section being at least as wide as the second pole tip is wide.

Preferably the second pole is at least one micron wider than the first pole. The top surface of the gap section and the first pole can form a planarized work area wider than the first pole. The poles form together into a single structure and are connected distal to the tips defining a yoke, the yoke including a coil structure having at least a first and a second lead, the leads coupleable to a source of electrical energy to complete an energization circuit.

In yet another aspect of the invention, a magnetic head with reduced topographical steps/edges and reduced resultant spurious reflections during lithographic processing, includes a substrate, an insulating layer over the substrate, first pole piece upon the layer, a second pole piece, a gap section, the gap section intermediate and coupled to the pole pieces, and the gap section being at least about as wide as the second pole piece and at least as wide as the first pole piece. Preferably, a planarizing layer is defined upon the first pole piece, whereby the first pole piece plus the planarizing layer is at least about as wide as the second pole piece. The planarizing layer can be Al$_2$O$_3$ or SiO$_2$ or photoresist material, for example.

In still another aspect of the present invention, a method for forming the poles of a thin film head, the head having at least two poles separated by a gap section, includes the steps of forming a planarizing layer at the first of the poles at its tip whereby a uniform planar area can be defined at the pole tip and the planarizing layer, forming the gap section coupled to the uniform planar area, and forming the second pole coupled to the gap section. The planarizing layer may include hard-baked photoresist material.

This process may include forming a layer of insulating material adjacent to and over the first pole and lapping the insulating material such that the top surface of the first pole and the insulating material confirm to a single plane whereby the uniform planar area is defined. The planarizing layer may be Al$_2$O$_3$, SiO$_2$, or polyimide, for example In a further aspect of the invention, in fabrication of a multilayer magnetic device, where a first structure is formed on a workpiece and serves as a base for a second structure, a process of rendering the surface of the first structure capable of supporting the second structure even if the second structure is equal to or wider than the first structure, and eliminating step/edges and spurious reflections thereby, includes the steps of: applying a leveling material over the surface of the first structure; photo patterning the leveling material; exposing and developing a desired portion of the first structure; and baking the workpiece and forming a planarized plateau across and beyond the surface of the first structure. The leveling material may be photoresist or polyimide, for example. An embodiment of the process may be characterized in that the formed structure is a first pole of a magnetic transducer, wherein the leveling material is positive photoresist and is photo-patterned using a resist border mask, and wherein a resist border is retained extending over the first pole at least at the pole tip region after exposure and development of the photoresist. Preferably, the border mask inner dimension is slightly smaller than that of the plated pole tip width and forms a shoulder over the first pole.

Preferably, the photoresist is hard-baked at a temperature of approximately 265° C. or the polyimide is hard-baked at a temperature of approximately 350° C. This process may include applying a vacuum with a 10 cubic feet per hour nitrogen backfill in a magnetic field.

Preferably, the leveling compound overlaps the edges of the first structure by approximately one-quarter to one-half micron. Preferably, step/edges are eliminated by the planarized plateau.

In an additional aspect of the invention, in a head having a gap layer extending over and possibly beyond the sides of a pole, a method for improving gap layer uniformity by preventing thinning of the gap layer at the side corners of the pole during gap layer formation, includes the steps of: forming the pole on a substrate; applying a leveling material over and beyond the surface of the pole; and forming the gap layer with the leveling material over and possibly extending beyond the sides of the pole.

Other advantages and features will become apparent from the following description of the preferred embodiment and from the claims.

DESCRIPTION OF THE PREFERRED EMBODIMENT

Figure 1:
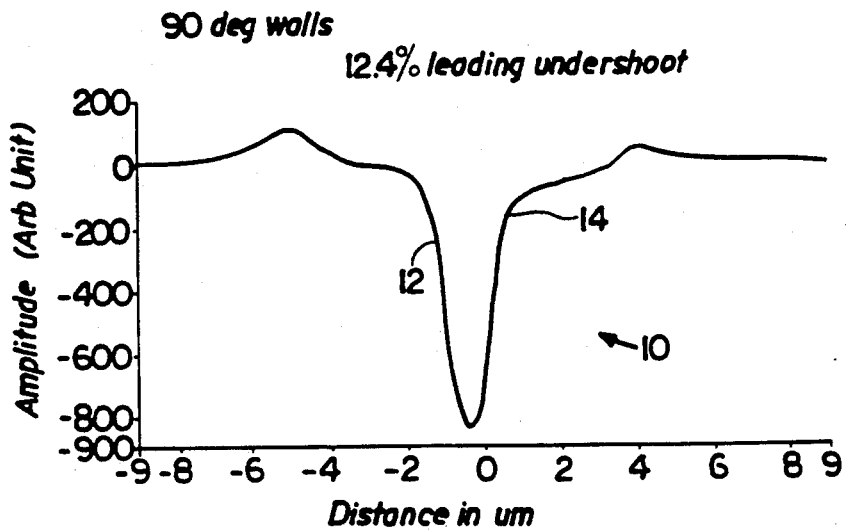
FIG. 1 is a graphical representation of a typical waveform generated by a thin film recording head reading a transition from a magnetic storage medium.

A typical waveform generated by a thin film magnetic recording head reading a transition from a magnetic medium is shown in the graphical representation of FIG. 1. It will be noted that pulse 10 is defined by a leading half 12 and a trailing half 14, which are not exactly alike. This asymmetry contributes to the variable peak shifts which normally occur when reading a series of transitions from a medium. If the transverse components of waveforms arising from transverse recording were substantially reduced, then the asymmetry and the variability in the peak shifts would be minimized accompanied by an attendant increase in window margin.

Figure 2:
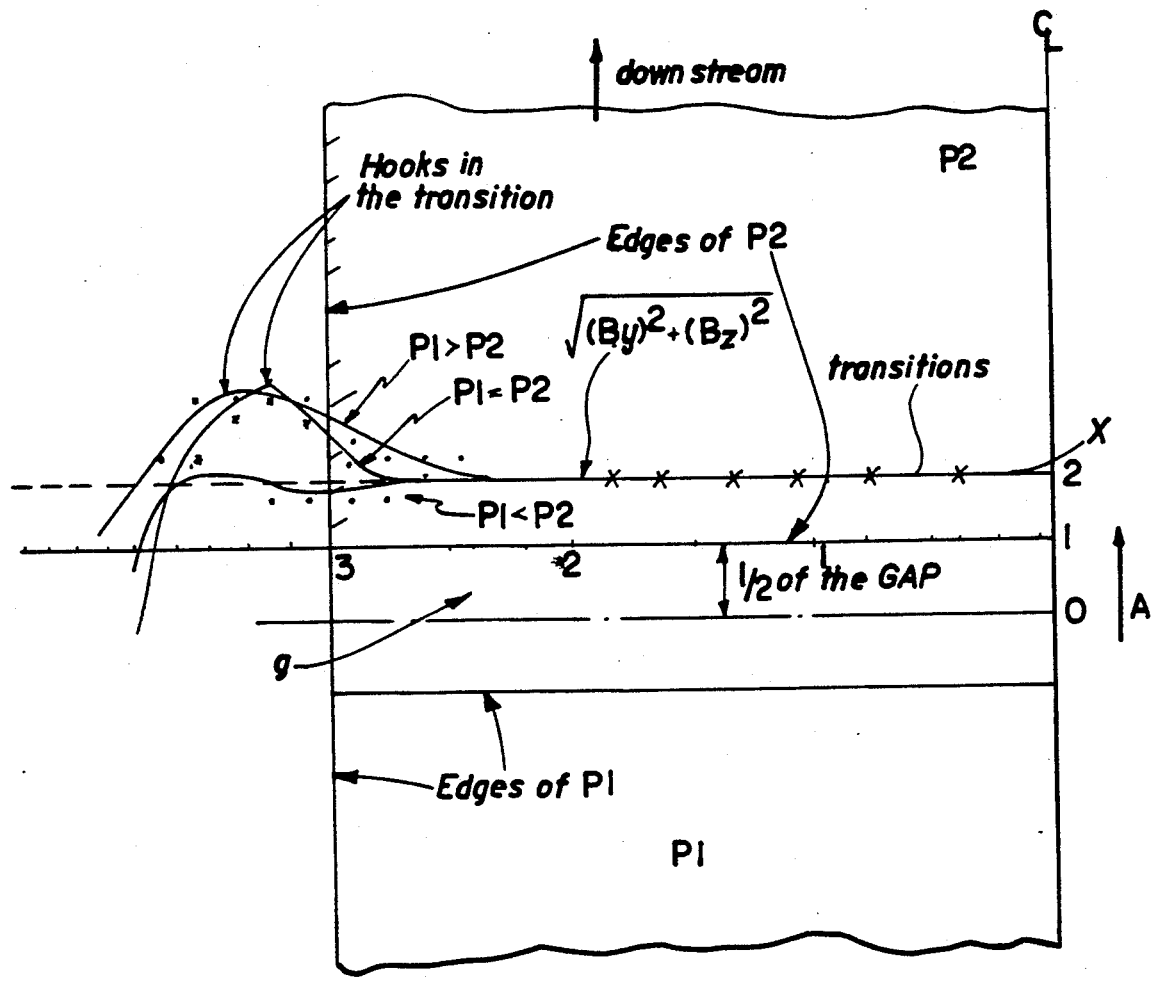
FIG. 2 is a graphical representation of the vectorial sum of the in-plane magnetic field components from different head pole tip geometries, as experienced at the medium mid-surface.

Turning now to FIG. 2, which is a graphical representation of a transition from each of three recording head pole tip geometries (the first pole greater than, equal to, and less than the second pole), the ill effects of transverse field components upon recording will be described. Upon this graph is superimposed the projection of a magnetic head having two equal width poles, P1 and P2, where adjacent portions of the P1 and P2 pole tips are shown defining gap g. In FIG. 2, distance along the track is shown in an arbitrary scale on the X-axis, while location of a transition relative to location of the gap is also shown in an arbitrary scale on the Y-axis. Furthermore, for each pole tip geometry, only the contour along which the effective in-plane head field equals the coercivity of the medium is shown, which is the active recording region of the head during the write cycle. Also shown is an arrow A which indicates the direction of medium movement, and a center line indication on the right hand vertical axis which signifies that only one half of the transition and the recording head are shown in this figure.

When the width of the P2 pole at the air bearing surface is equal to or less than that of P1, the magnitude of the transverse components of the head field are about the same as or are larger than that of the longitudinal components at the fringe zones. Hence, the vectorial sum of these components at the fringe zones will be at the level of the recording medium coercivity further downstream than at the center of the poles. Therefore, the recorded transition will be imparted with hooks at the fringe zones which will interact with the previously recorded bit, causing nonlinear inter-symbol interference at high bit densities. These hooks can be about 1.5 micron wide on either side of the pole edges and can penetrate about 0.3 microns downstream, depending upon the field produced by the head. As the write current through the head is increased, the head field influencing the medium increases proportionately and the hooks become more prominent. Therefore, at high bit densities, this nonlinear interference between closely recorded bits causes a reduction of readback amplitude as the write current is increased, a phenomenon which we define as "peakiness."

It will be appreciated that the transverse component of the head field has an asymmetrical distribution along the direction of media motion. Thus, if the transverse head field along one pole is considered as being positive, then the transverse head field along the other pole will be negative. By the principle of reciprocity, it can be shown that the resulting transverse readback waveform is also asymmetrical. This transverse readback waveform is of opposite sign to the longitudinal readback waveform during the leading portion 12 of the central pulse 10 of FIG. 1; it is of the same sign as the longitudinal readback waveform during the trailing portion 14 of FIG. 1. This is a result of the transverse head field during readback near pole P1 being in a direction opposite to the direction of the transverse orientation of the medium magnetization which has been determined during writing by pole P2. Hence, the leading position's "20%-to-90%" rise time of the resulting readback pulse is reduced, while the trailing portion's "90%-to-20%" fall time is increased, because of the asymmetry in the transverse component of the readback waveform.

When the width of the P2 pole at the air bearing surface is equal to or less than that of P1, the vertical component of the head field is typically about two times the coercivity in the recording zone and the resultant head field is about 60° out-of-plane. When the head field is greater than about 45° or 50° out-of-plane, then the in-plane switching field of high coercivity media is reduced. As a result, the longitudinal dimension of the recorded transition is increased which leads to wider pulse widths and lower high frequency amplitudes. Again, as the write current through the head is increased, the vertical field increases, thus causing further degradation of high frequency readback amplitude, i.e., an increase in peakiness.

When the P2 pole is wider than the P1 pole, such as by a few microns, the transverse fields at the fringe zones are reduced, perhaps by 35% in magnitude compared to the above configurations, and also the non-parallel contours of the longitudinal component of the head field become parallel to the gap at the fringe zone. This favorable field distribution eliminates the hooks in the transition, since the transition is now essentially parallel to the gap at all points. A straight transition prevents the nonlinear interference of the current transition with the previous one during the writing cycle, also reducing peakiness.

The present invention substantially reduces asymmetry in the resulting readback waveforms by substantially reducing the transverse component during recording when the cross-section of pole P2 is wider than that of P1. Hence, the readback waveform is symmetrical and the magnitudes of the rise and fall times become nearly identical. This symmetry will result in a reduction of peak shift variability.

The present invention also reduces the vertical field at the recording zone such that the resultant head field is less than 50° out-of-plane. As a result, high coercivity media do not suffer any degradation in the magnitude of their in-plane switching field. Therefore, the high frequency readback amplitude remains almost constant with an increase in write current, thus minimizing peakiness.

Figure 3:
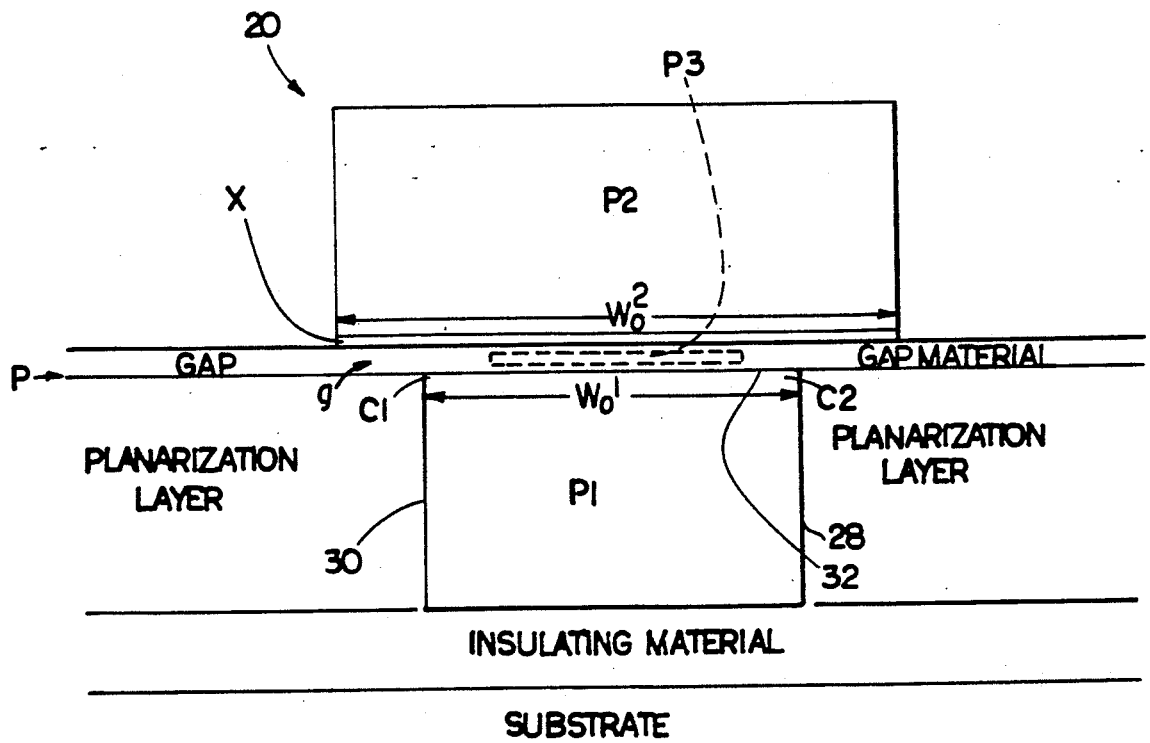
FIG. 3 is a cross-sectional schematic view of a preferred embodiment of the present invention.

Turning now to FIG. 3, which is a cross-sectional schematic view of the pole tips of a preferred recording head 20 of the present invention, it will be appreciated that a geometry is shown where the tip of pole P2 is wider than that of P1 near the gap. In particular, poles P1 and P2 define a gap g, where the width $W_o^2$ of the P2 pole at the gap is preferably one or more microns wider than the width $W_o^1$ of the P1 pole at the gap. The additional width of pole P2 over pole P1 at the gap ensures that the transverse component of the head field at the recording zone is minimized. Hence, the medium is essentially magnetized in the longitudinal direction. The write fringing of such a head design is approximately 0.25 microns smaller than that which occurs from a head where the P1 pole is wider than the P2 pole at the gap. We speculate that, for a given track pitch, the width of the P2 pole can be increased slightly, which produces a larger readback signal, thus improving the signal-to-noise ratio of the recording system.

In an alternative configuration of the present invention, a third pole piece P3 may be formed as part of head 20, embedded within the gap layer g. This third head is indicated by the dotted outline within gap layer g as shown in FIG. 3. The third pole piece at its tip is preferably configured to be both thin, less wide than pole P2, and magnetically saturable. It will be appreciated by those skilled in the art that this saturation property can be selectively used by applying appropriate energization to the coil structure at the yoke, whereby the third pole is effectively inoperative during the write cycle.

During the read cycle, the third pole is not saturated and effectively dominates reading such that a sharp transition waveform will result.

In known processes for making thin film heads, an insulating base layer of, for example $Al_2O_3$, is deposited on a ceramic substrate, such as 3M's ALSIMAG 204. A sputtered seed layer, such as NiFe, is applied over this insulating base layer (perhaps employing a metallic adhesion layer). Photoresist is then spun over the seed layer and a pole piece pattern is formed by a photolithographic process. After the resist is developed to form a mask, the first pole piece is plated through the mask. After this plating process is completed (including removing the mask, etching to exposed underlying seed and adhesion layers, remasking the first pole piece and then etching the plated areas of the pole), a gap layer, such as $SiO_2$ or $Al_2O_3$, is deposited thereon. However, this gap layer does not always adequately cover the P1 pole corners C1 and C2 defined by where the P1 pole top surface 32 meets the sidewalls 28 and 30, due to the abrupt change in topography at these sidewalls.

In the next steps, a coil structure is formed over the yoke with intermediate layers of insulation, and the second pole piece is formed over this coil structure and the gap layer. During these steps, a considerable thinning of the gap layer occurs, and it can become completely depleted at corners C1 and C2. During plating of the second pole piece, the width of the second pole at its tip is customarily plated to be narrower than the width of the first pole at its tip, in order to allow for microlithographic misalignment tolerances and perhaps also to avoid magnetic shorts occurring between the two poles at junctures C1 and C2 where the gap layer has thinned.

In practice of the present invention, the step at which the gap layer is deposited onto the P1 pole piece is preceded with a planarization process. This planarization involves forming a layer of non-magnetic material adjacent to the P1 pole on either side such that there is a uniform base on which the gap layer will be deposited. Hence, as shown in FIG. 3, the planarization layer assumes the same upper plane P as does the upper surface of pole P1.

A misaligned P2 pole can hang over the edge of a P1 pole, which can result in head pulse asymmetry and peak shift, in addition to increasing the likelihood of pole to pole shorting at the corners C1, C2 of the P1 pole. With a planarized P1 pole, such misalignment will not produce these negative effects, and in addition, present alignment/registration tolerances are relieved. As a result, in addition to the traditional P2 width less than P1 width configuration, it is now possible to conveniently produce magnetic heads where the P2 width is equal to or greater than the P1 width.

An additional benefit of planarization is that it improves uniformity of the gap layer atop pole P1 because of a more consistent angle of incidence of the pole surface with respect to the deposition stream. Hence, planarization should result in greater uniformity of gap layer coverage of the P1 pole especially at the pole tip edges. Also, erosion problems associated with topography, and changes in topography, are reduced or eliminated, since the erosion rate over a planar surface tends to be uniform, while the erosion rate at step edges tends to be accelerated.

Planarization also reduces lithographic complexity in the pole tip region. In practice of the present invention, it is therefore possible to present a plateau, rather than a valley/mesa combination with step edges, upon which subsequent structures can be deposited/exposed/developed. This improves critical dimension control by eliminating stray reflections off the step edges and allows generation of more vertically walled P2 poles.

As a result of the planarization layer, the gap layer assumes a uniform thickness over the entire P1 top surface, and if thinning occurs it does so uniformly over the entire gap layer during the successive steps of the process described above. The width of the second pole piece P2 then becomes independent of the width of pole piece P1, where the planarized gap layer is at least as wide as the overlaid P2 pole. Hence, when pole piece P2 is plated to be wider than or approximately equal to pole piece P1, no magnetic shorting occurs at the gap.

Figure 4:
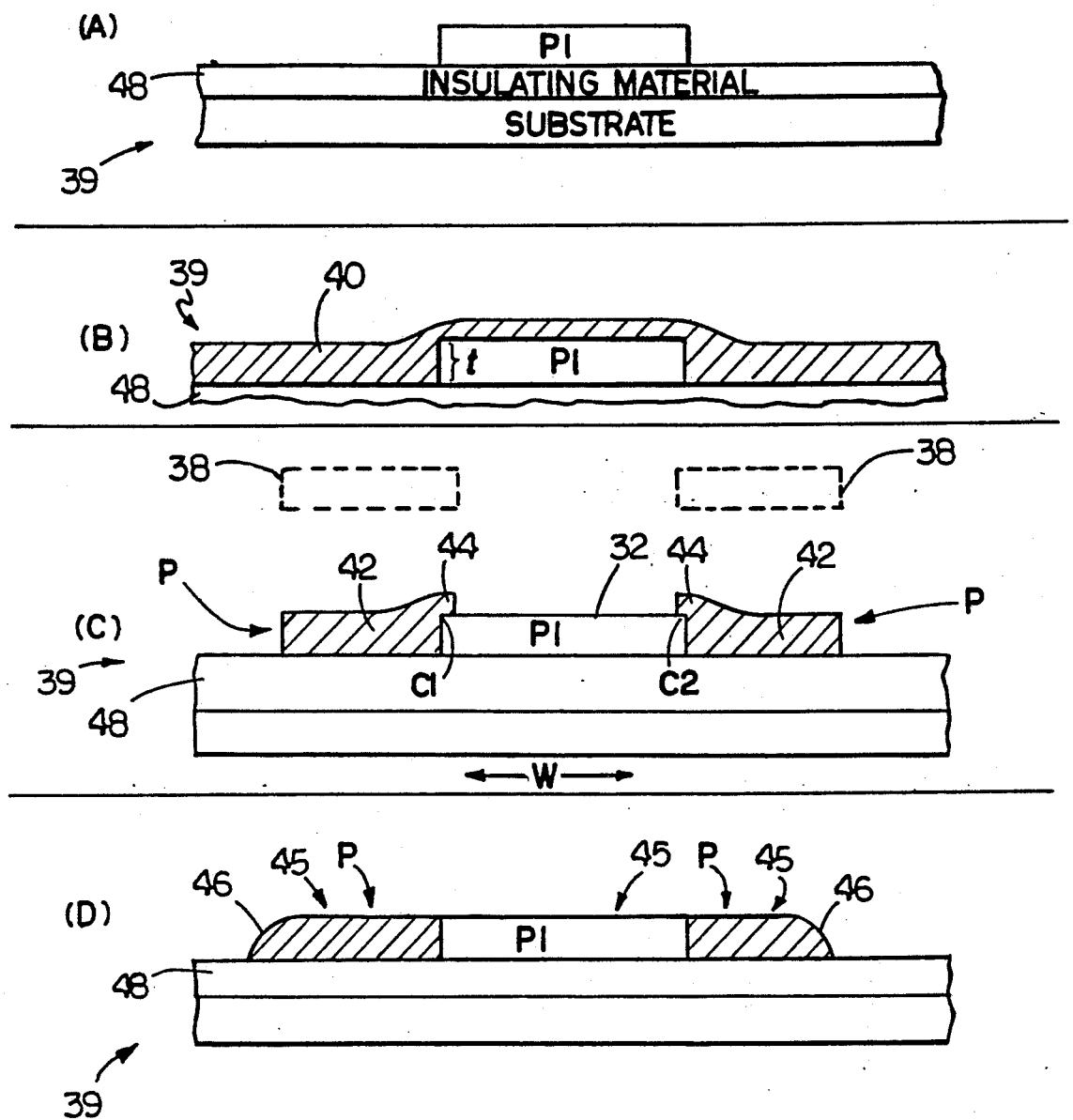
FIGS. 4A–D show in cross-sectional view the process of planarization of a P1 pole in practice of the invention.

A preferred embodiment of the photoplanarization process is described with respect to FIGS. 4A-4D. In FIG. 4A, a P1 pole is shown on an insulating layer 48 upon a wafer 39 in practice of conventional process technology. In FIG. 4B, a positive photoresist (e.g. AZ1375) is spun on top of workpiece 39 of FIG. 4A, for example, at approximately 4,000 rpm in the case of a 3.0 micron thick P1 pole. The resist viscosity and spin speed affect the spun film thickness, and should be adjusted according to pole thickness t. Photoresist 40 will settle on and over the P1 pole and will assume approximately the configuration (in cross-section) as shown in FIG. 4B.

In the next step, photoresist 40 is pattern-wise exposed and developed as is well known to those practiced in microlithography using a photoresist border pattern mask 38 (shown in dotted outline in FIG. 4C). By virtue of this process, a resist border 42 is retained around the P1 pole, or at least at the pole tip region, after exposure and development. Border 42 overlaps the P1 pole in the track width direction W, ultimately to insure a smooth transition from the pole top surface 32 to the planarized plateau P after further processing. As a result of the slight overlap of border 42, a raised portion of photoresist 40 will remain on top of pole P1 after developing, as indicated in FIG. 4C by the slight shoulders 44 overriding the corners C1 and C2 of pole P1. Preferably each resist shoulder will overlap pole P1 by approximately one-quarter to one-half micron.

Photoresist 40 remaining on workpiece 39 is hard-baked thereafter. In this process, the resist will undergo thermal flow and cross-linking, and shoulders 44 atop the P1 pole corners C1, C2 will thin out by means of surface tension in the polymer as it passes the glass transition point. The result is a rather smooth-surfaced, chemically resistant plateau P. This plateau P, acting in concert with the top surface 32 of pole P1, yields substantially flat areas 45 and terminates with smoothly downward sloped outer walls 46 which merge with insulating base layer 48, as seen in FIG. 4D. (This provides a substantially flat workpiece, however, a slight elevation may be experienced at the point where the photoresist meets flat area 45.) This structure is suitable for further processing, such as gap layer deposition and plating of pole P2 (less than, equal to or wider than pole P1). In alternative embodiments, however, it may be desirable to lap the planarized surface P before further processing.

Hard-baking of photoresist 40 is preferably performed at 265° C., under vacuum with 10 cubic feet per hour nitrogen backfill. A magnetic field may also be applied during this process to effect desired anisotropic magnetic pole performance characteristics.

Referring again to the spun on photoresist, it is noted that too low a spin speed will result in minor smooth hard-baked photoresist "ears" at the edges of the P1 pole. This will provide a slightly thicker gap locally. Too high a spin speed will have less of an effect, but will result in sloping down of the entire planarized surface as it extends away from pole P1 and will result in a sloping down of pole P2 formed thereover.

Alternative process steps may be followed in practice of the above photoplanarization invention. For example, polyimide has advantages over hard-baked photoresist in that it is less brittle, mechanically strong and highly chemically resistant. These properties are advantageous for a material which in the pole tip region would be submitted to mechanical processing and solvent cleaning. The disadvantages of polyimide, however, are that the material does not round and flow as well as photoresist, and additional process steps and final cure temperatures greater than 350° are required to fully imidize the polymer. This latter constraint may be mitigated by curing in an orienting magnetic field.

In one alternative process, a polyimide coating of a thickness equal to or slightly greater than the P1 pole piece thickness is spun onto the wafer and is partially cured. Positive resist is then spun onto the wafer and patterned using a mask similar to that described above. The polyimide is then patterned (in the partially cured state) via the positive resist using a hydroxide-based developer.

The wafer is then polished. For example, it can be inverted on a one-half micron (or less) grit, mylar mounted, fixed particle abrasive polishing media, and then the wafer is slightly pulled across the polishing media to remove excess resist from the top surface of the pole piece. A low amount of force is required to remove the soft-baked resist. Surface scratching should be avoided by using low polishing forces in low grit size, although the actual process may include a rough polish followed by polishing steps using increasingly finer grit size.

In the next step, the polyimide is fully cured at 350° C.

In the processes described above, any positive acting photoresist may be used, such as AZ-1375, diazide sensitizer, phenolic resin, etc. The resist used will depend upon the pole thickness to be planarized. Resists are available in different viscosity ranges, which will affect coating thickness. The spin coating speed will also depend upon resist type and desired thickness. In our experience, we have found that coating thickness resulting on the wafer should be approximately 20% to 30% greater than the pole thickness being planarized, in order to allow for volume shrinkage which will occur from hard baking. Also, after spin coating, a soft bake at 90° C. for 30 minutes is preferably performed to drive off resist coating solvents, which is a standard process procedure.

As a result of the foregoing, conventional thin film head fabrication may be modified to provide an inexpensive, quick and high yield process for generation of magnetic thin film heads not otherwise practically possible heretofore. Thus, new configurations of the P2 pole equal to and wider than the P1 pole can be conveniently achieved.

The configuration of the pole tips in practice of the present invention can be of any desired combination. For example, a substantially rectangular portion adjacent to the gap and a substantially trapezoidal portion adjacent to the rectangular portion can be defined in either or both of the pole tips, in order to minimize undershoots that result in the readback waveforms from thin film heads. Furthermore, it is recognized that other modifications and variations of the present invention will occur to those skilled in the art, and it is intended that all modifications and variations be included within the scope of the appended claims.

What is claimed is:

1. A method for forming a thin film head that comprises at least two poles separated by a gap section, the steps comprising:
    (a) disposing a leveling material adjacent to and partially over an upper surface of a tip of a first of said poles, and curing the portion of said leveling material that is disposed partially over said upper surface to cause said portion of said leveling material that is disposed partially over said upper surface to flow to form, in conjunction with the portion of said leveling material that is disposed adjacent to said tip of said first of said poles, a planarizing layer adjacent to said tip of said first of the poles, the planarizing layer defining a uniform planar area comprised of an upper surface of the tip of the first of the poles and an upper surface of the planarizing layer,
    (b) forming the gap section upon the uniform planar area, the gap section being coupled with the uniform planar area, and
    (c) forming a tip of a second of the poles upon the gap section, the tip of the second of the poles being coupled with the gap section, the second pole tip being equal in width to or wider than the tip of the first pole.

2. The method of claim 1 wherein the leveling material is comprised of photoresist material and wherein the curing step includes hard baking the material.

3. The method of claim 1 wherein step (a) comprises forming a layer of insulating material adjacent to the tip of the first pole and forming a border of said insulating material on a portion of the upper surface of the tip of the first pole, and
    after said leveling material is cured to form said planarizing layer, lapping said planarizing layer.

4. The method of claim 1 wherein the planarizing layer is comprised of polyimide.

5. The method of claim 1, wherein said planarizing layer is comprised of polyimide, and wherein step (a) comprises
    patterning said polyimide, and
    baking said polyimide.

6. A process of fabricating a multilayer magnetic transducer device, comprising the steps of:
    A. applying a leveling material adjacent to a first magnetic pole tip structure and over an upper surface of the first magnetic pole tip structure,
    B. photo patterning the leveling material, by exposing and developing a portion of the leveling material that rests on the upper surface of the first magnetic pole tip structure, to remove said leveling material from a portion of said upper surface, said leveling material remaining over another portion of said upper surface,
    C. baking the remaining leveling material, to form a planarized plateau comprising the upper surface of the first magnetic pole tip structure and an upper surface of the leveling material, D. forming a gap section upon the planarized first magnetic pole tip structure, and E. forming a second magnetic pole tip structure upon the gap section, the second magnetic pole tip structure being at least as wide as the first magnetic pole tip structure.

7. The process of claim 6 wherein the leveling material is photoresist or polyimide and is spun onto a workpiece on which the first magnetic pole tip structure rests and onto the upper surface of the first magnetic pole tip structure.

8. A process of fabricating a multilayer magnetic transducer device, comprising the steps of:

A. applying a leveling material adjacent to a first magnetic pole tip structure and over an upper surface of the first magnetic pole tip structure, B. photo patterning the leveling material, by exposing and developing a portion of the leveling material that rests on the upper surface of the first magnetic pole tip structure, C. baking the leveling material, to form a planarized plateau comprising the upper surface of the first magnetic pole tip structure and an upper surface of the leveling material, D. forming a gap section upon the planarized first magnetic pole tip structure, and E. forming a second magnetic pole tip structure upon the gap section, the second magnetic pole tip structure being at least as wide as the first magnetic pole tip structure, wherein the leveling material is positive photoresist and is photo patterned using a resist border mask, and the step of photo patterning results in a photoresist border remaining over a portion of the upper surface of the first magnetic pole tip structure after exposure and development of the photoresist.

9. The process of claim 8 wherein the border mask has inner dimensions that are slightly smaller than dimensions of the upper surface of the first magnetic pole tip structure.

10. The process of claim 9 wherein the photoresist border forms a shoulder over edges of the upper surface of the first magnetic pole tip structure.

11. The process of claim 7 wherein the photoresist is hard-baked at a temperature of approximately 265° C.

12. The process of claim 7 wherein the polyimide is hard-baked at a temperature of approximately 350° C.

13. The process of claim 11 wherein the step of baking the leveling material is performed in presence of a vacuum with a nitrogen backfill and in presence of a magnetic field.

14. The process of claim 12 wherein the step of baking the leveling material is performed in presence of a vacuum with a nitrogen backfill and in presence of a magnetic field.

15. A process of fabricating a multilayer magnetic transducer device, comprising the steps of:

A. applying a leveling material adjacent to a first magnetic pole tip structure and over an upper surface of the first magnetic pole tip structure, B. photo patterning the leveling material, by exposing and developing a portion of the leveling material that rests on the upper surface of the first magnetic pole tip structure, C. baking the leveling material, to form a planarized plateau comprising the upper surface of the first magnetic pole tip structure and an upper surface of the leveling material, D. forming a gap section upon the planarized first magnetic pole tip structure, and E. forming a second magnetic pole tip structure upon the gap section, the second magnetic pole tip structure being at least as wide as the first magnetic pole tip structure, wherein the step of photo patterning the leveling material results in the leveling compound overlapping edges of the upper surface of the first magnetic pole tip structure by approximately one-quarter to one-half micron.

16. The process of claim 6 wherein the planarized plateau provides a surface without steps and edges, upon which material can be deposited.

17. The method of claim 1 wherein the tip of the second of the poles is wider than the tip of the first of the poles.

18. The process of claim 6 wherein the second magnetic pole tip structure is wider than the first magnetic pole tip structure.

19. A method for forming a thin film head that comprises at least two pole structures separated by a gap section, comprising the steps of:

disposing a leveling material adjacent to and partially over an upper surface of a tip of a first of said pole structures, curing the portion of said leveling material that is disposed partially over said upper surface to cause said portion of said leveling material that is disposed partially over said upper surface to flow to form, in conjunction with the portion of said leveling material that is disposed adjacent to said tip of said first of said pole structures, a planarizing layer adjacent to said tip of said first of the pole structures that defines a uniform planar area comprised of said upper surface of said tip of said first of said pole structures and an upper surface of said planarizing layer, forming said gap section upon said uniform planar area, said gap section being coupled with said uniform planar area, and forming a tip of a second of said pole structures upon said gap section, said tip of said second of said pole structures being coupled with said gap section.

20. The process of claim 19 wherein said step of curing said leveling material comprises baking said leveling material in a manner such that any of said leveling material that is located over said portion of said upper surface of said first of said pole structures flows to form said planarizing layer.

21. The process of claim 19 wherein said step of curing said leveling material to form said planarizing layer is followed by the step of lapping said leveling material.

22. The process of claim 19 wherein said tip of said second of said pole structures is wider than said tip of said first of said pole structures.

* * * * *